US012031364B2

(12) United States Patent
Peng

(10) Patent No.: US 12,031,364 B2
(45) Date of Patent: Jul. 9, 2024

(54) CHILD LOCK STRUCTURE, HOOK STRUCTURE, HANDLE STRUCTURE AND HEATING BARREL

(71) Applicant: Wenfeng Peng, Guangdong (CN)

(72) Inventor: Wenfeng Peng, Guangdong (CN)

( * ) Notice: Subject to any disclaimer, the term of this patent is extended or adjusted under 35 U.S.C. 154(b) by 0 days.

(21) Appl. No.: 18/369,854

(22) Filed: Sep. 19, 2023

(65) Prior Publication Data

US 2024/0060340 A1 Feb. 22, 2024

(51) Int. Cl.

| | |
|---|---|
| ***E05C 9/00*** | (2006.01) |
| ***A47K 10/02*** | (2006.01) |
| ***B65D 25/02*** | (2006.01) |
| ***B65D 25/20*** | (2006.01) |
| ***B65D 25/28*** | (2006.01) |
| ***B65D 43/02*** | (2006.01) |
| ***B65D 50/00*** | (2006.01) |
| ***B65D 51/24*** | (2006.01) |

(52) U.S. Cl.

CPC .............. *E05C 9/00* (2013.01); *A47K 10/025* (2013.01); *B65D 25/02* (2013.01); *B65D 25/20* (2013.01); *B65D 25/2841* (2013.01); *B65D 43/0229* (2013.01); *B65D 50/00* (2013.01); *B65D 51/24* (2013.01); *B65D 2215/00* (2013.01); *B65D 2543/00092* (2013.01); *B65D 2543/0049* (2013.01)

(58) Field of Classification Search

CPC ......... E05C 9/00; A47K 10/025; B65D 25/02; B65D 25/20; B65D 25/2841; B65D 43/0229; B65D 50/00; B65D 51/24; B65D 2543/00092

USPC .......................................................... 219/521

See application file for complete search history.

(56) References Cited

U.S. PATENT DOCUMENTS

| | | | | | |
|---|---|---|---|---|---|
| 421,570 | A * | 2/1890 | Heiser | B65D 25/20 | 217/77 |
| 1,696,388 | A * | 12/1928 | Curtis | B65D 43/0229 | 220/301 |
| 3,208,630 | A * | 9/1965 | Bauer | B65D 25/32 | 220/769 |
| 3,216,148 | A * | 11/1965 | Amberg | A01K 97/04 | 220/366.1 |
| 4,245,685 | A * | 1/1981 | Nemitz | B65D 43/0212 | 220/675 |
| 4,296,871 | A * | 10/1981 | Andersson | B65D 43/0212 | 206/508 |

(Continued)

FOREIGN PATENT DOCUMENTS

CA 2640536 A1 * 4/2009 ......... B65D 47/0838

*Primary Examiner* — Eric S Stapleton

(57) ABSTRACT

Provided is a child lock structure, hook structure, handle structure, and heating barrel. It includes a barrel ring mouth, a barrel cover, and a turnbuckle. The barrel ring mouth is arranged at the top of the heating barrel. The barrel cover is rotatably clamped at the top of the barrel ring mouth through the turnbuckle. The turnbuckle includes two pressing buckles symmetrically arranged at the top of the barrel ring mouth and two clamping buckles symmetrically arranged at the bottom of the barrel cover. The turnbuckle also includes a clamping groove arranged at the top of the barrel ring mouth and below the pressing buckles, so that the barrel cover and the barrel ring mouth are closed and the pressing buckles and clamping buckles are staggered.

1 Claim, 7 Drawing Sheets

(56) References Cited

U.S. PATENT DOCUMENTS 4,300,612 A * 11/1981 Schroeder, Jr. .... B65D 23/0885 220/675
4,872,563 A * 10/1989 Warder .................... G21F 5/12 604/404
8,348,086 B2 * 1/2013 Apps ...................... B65D 11/06 220/601
8,740,264 B2 * 6/2014 Akizuki ................ E05B 77/265 292/216
8,820,571 B2 * 9/2014 Apps .................. B65D 77/0486 220/675
8,844,758 B1 * 9/2014 Kummer ............ B65D 43/0231 206/508
10,407,917 B1 * 9/2019 Bilge .................. E04F 13/0816
11,027,879 B2 * 6/2021 Falvey ................... B65D 25/28
11,420,787 B2 * 8/2022 Falvey ..................... B65D 1/46
2003/0005617 A1 * 1/2003 Holverson, Jr. ... B65D 43/0231 220/916
2003/0075472 A1 * 4/2003 McDade .............. B65D 21/062 206/505
2006/0191947 A1 * 8/2006 Jedryk ................... B65D 45/20 220/788
2006/0213912 A1 * 9/2006 Zaytoun ................. B65D 41/06 220/717
2007/0003357 A1 * 1/2007 Schoemer ............ A47G 19/303 401/12
2007/0012693 A1 * 1/2007 Kummer ............ B65D 43/0231 220/4.27
2009/0294521 A1 * 12/2009 de la Huerga .......... A61J 1/035 235/375
2010/0089926 A1 * 4/2010 Lacy ......................... B65F 1/10 220/521
2010/0264140 A1 * 10/2010 Apps .................. B65D 21/0233 220/675
2010/0288769 A1 * 11/2010 Cheng ................ B65D 43/0202 220/259.4
2011/0180535 A1 * 7/2011 Apps .................... B67D 1/0835 220/254.1
2011/0260476 A1 * 10/2011 Akizuki .................. E05B 81/36 292/200
2012/0085674 A1 * 4/2012 Kemper ............. B65D 43/0229 206/508
2012/0318697 A1 * 12/2012 Stern .................. B65D 21/0233 206/514
2013/0000363 A1 * 1/2013 Akizuki ................ E05B 77/265 70/101
2013/0180617 A1 * 7/2013 Apps .................... B67D 1/0804 141/2
2013/0270298 A1 * 10/2013 Dejonge ............. B05B 11/0032 222/162
2014/0069917 A1 * 3/2014 Meyers ................ B65D 21/022 220/23.88
2016/0068304 A1 * 3/2016 Bochner ............ B65D 21/0204 206/508
2016/0243319 A1 * 8/2016 Szymiczek .......... A61M 11/007
2018/0222657 A1 * 8/2018 Rundin ................ B65D 25/282
2019/0100364 A1 * 4/2019 Bolen ................... A61J 1/1437
2019/0128027 A1 * 5/2019 Schroll ................... E05B 81/90
2019/0144176 A1 * 5/2019 Yourist ................ B65D 50/048 215/217
2020/0062443 A1 * 2/2020 Falvey ................... B65D 7/045
2020/0231330 A1 * 7/2020 Falvey ................... B65D 11/06
2020/0239192 A1 * 7/2020 Maurier ................. B65D 25/24
2020/0248486 A1 * 8/2020 Okuyama ............... E05B 79/08
2021/0009323 A1 * 1/2021 Markarian ............... B65D 1/10
2021/0114783 A1 * 4/2021 Sibley .................... B65D 53/02
2021/0122539 A1 * 4/2021 Martin ................... B65D 51/18

* cited by examiner

CHILD LOCK STRUCTURE, HOOK STRUCTURE, HANDLE STRUCTURE AND HEATING BARREL

BACKGROUND OF THE INVENTION

1. Field of the Invention

The invention relates to electrical appliances, and more particularly to a child lock structure, hook structure, handle structure and heating barrel.

2. Description of Related Art

Heating barrel is an electrical appliance used to dry towels, bath towels and clothes. With the continuous development of society, heating barrel is becoming more and more popular.

At present, the heating barrels on the market still have the following shortcomings:

The top of the existing heating barrels are mostly with covers without locks, which is easy to be opened by children by mistake, and the use safety cannot be guaranteed.

The existing heating barrel handles are mostly two and protrude to the outside of the heating barrel, which is unsightly in appearance.

The existing of heating barrel hooks need to be welded for many times, and there are many welding spots, the stability of which is affected by high thermal environment for a long time.

Thus, the need for improvement still exists.

SUMMARY OF THE INVENTION

In order to achieve the above purposes, the invention provides the following technical scheme: a child lock structure, hook structure, handle structure and heating barrel, including a barrel ring mouth, a barrel cover and a turnbuckle, wherein the barrel ring mouth is arranged at the top of the heating barrel, and the barrel cover is rotatably clamped at the top of the barrel ring mouth through the turnbuckle.

As a preferred technical scheme of the invention, the turnbuckle comprises at least two pressing buckles symmetrically arranged at the top of the barrel ring mouth and at least two clamping buckles symmetrically arranged at the bottom of the barrel cover.

As a preferred technical scheme of the invention, the turnbuckle further comprises a clamping groove which is opened at the top of the barrel ring mouth and located below the pressing buckle, so as to close the barrel cover and the barrel ring mouth and stagger the pressing buckle and the clamping buckle; rotate the barrel cover to drive the clamping buckle into the inside of the clamping groove, to realize the locking of the barrel cover and the barrel ring mouth.

As a preferred technical scheme of the invention, the top of the barrel cover is provided with a handle.

A hook structure, comprising a hook ring and a barrel ring mouth, characterized in that: the hook ring is movably arranged inside the barrel ring mouth, and the hook ring is formed by one-time stamping; the inner ring of the hook ring is stamped with a number of not less than one U-shaped hook, and the hook ring and the U-shaped hook are stamped with a Z-shaped connector.

A handle structure, comprising a handle base and a handle body, characterized in that: the handle base is embedded on the outer wall of the heating barrel, and the handle base is provided with a U-shaped groove inside; the handle body is U-shaped and is rotatably connected with the U-shaped groove; when the handle body is flipped to lift the heating barrel, the center of gravity of the handle body and the center of gravity of the heating barrel are on the same vertical line.

As a preferred technical scheme of the invention, one side of the inner wall of the U-shaped groove is provided with a turnover groove, and the tops of the two ends of the handle body are also provided with limit notches.

A heating barrel, comprising the child lock structure, the hook structure, the handle structure and a barrel body, wherein the barrel ring mouth is fixedly installed at the top of the barrel body, and the handle base is fixedly embedded on the outer wall of the barrel body.

As a preferred technical scheme of the invention, the outer wall of the barrel body is embedded with a display module, which comprises a digital display bracket embedded on the outer wall of the barrel body, a PCB bracket arranged on one side of the digital display bracket and a display panel arranged on one side of the PCB bracket; a circle at the bottom of the barrel body is also provided with at least one support leg.

The inner bottom of the barrel body is provided with a base, and the inside of the base is provided with a power cord rack with one end extending into the barrel body.

The bottom of the barrel cover is provided with an aromatherapy tablet holder.

As a preferred technical scheme of the invention, the inside of the barrel ring mouth is provided with a digital display key, which comprises a circuit board bracket, a circuit board arranged on the circuit board bracket and a switch key arranged on one side of the circuit board. One side of the switch key extends to the outside of the barrel ring mouth.

As a preferred technical scheme of the invention, compared with the prior art, the invention provides a child lock structure, hook structure, handle structure and heating barrel, which has the following beneficial effects:

With the arrangement of the child lock structure, the hook structure, the handle structure and the heating barrel, and the single handle body, the structure is simplified; after the heating barrel is lifted, the centers of the handle body and the heating barrel are on a same vertical line, so that the lifting is more stable; the hook ring is formed by one-time stamping, and the whole body has only one welding spot, so that the stability is higher; the barrel cover is clamped with the barrel ring mouth by the turnbuckle, so that the child lock is realized, and the situation that children are scalded when opening the cover is avoided.

The above and other objects, features and advantages of the invention will become apparent from the following detailed description taken with the accompanying drawings.

DETAILED DESCRIPTION OF THE INVENTION

Figure 1:
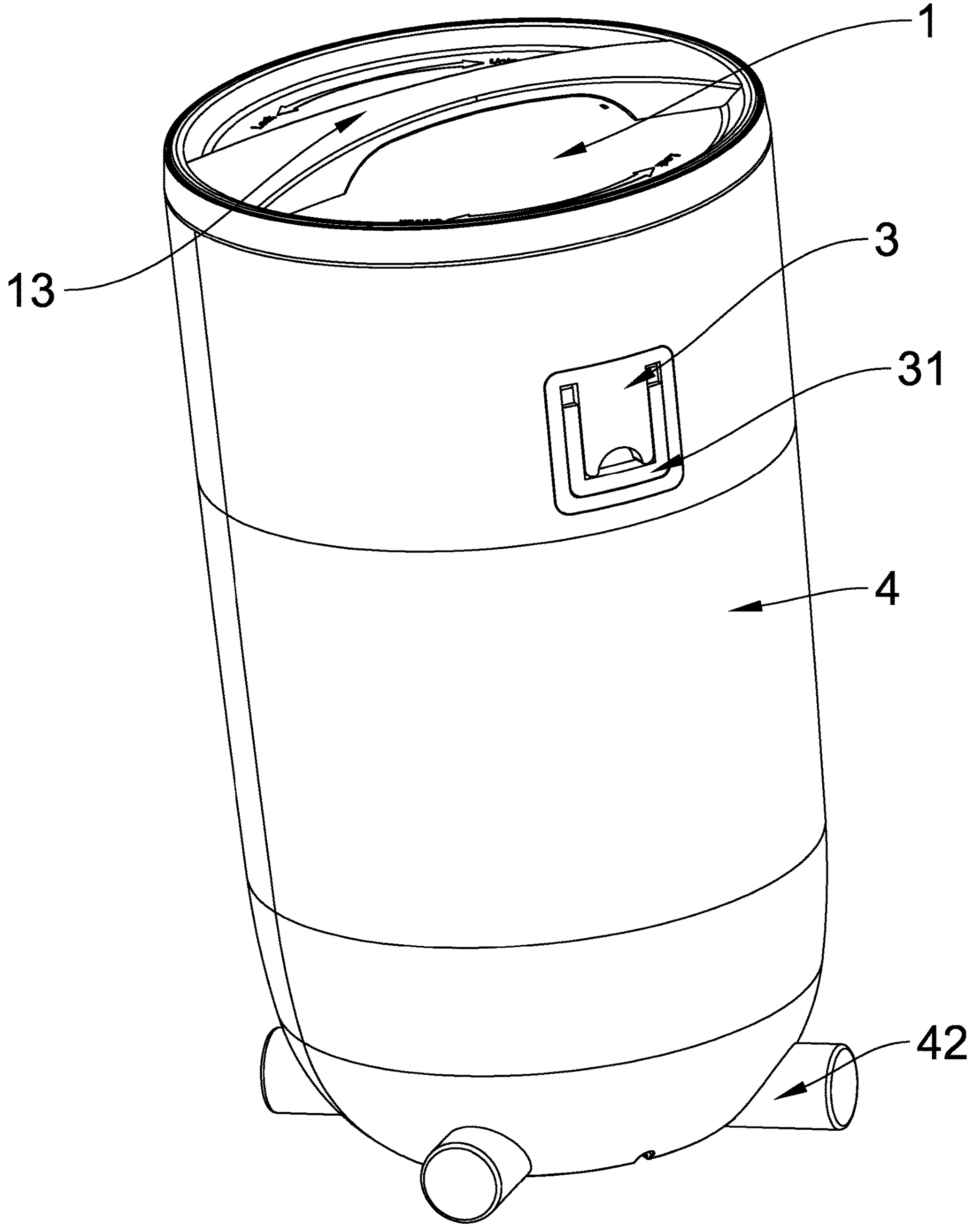
FIG. 1 is a structural schematic diagram of a child lock structure, hook structure, handle structure and heating barrel proposed by the invention.
Figure 2:
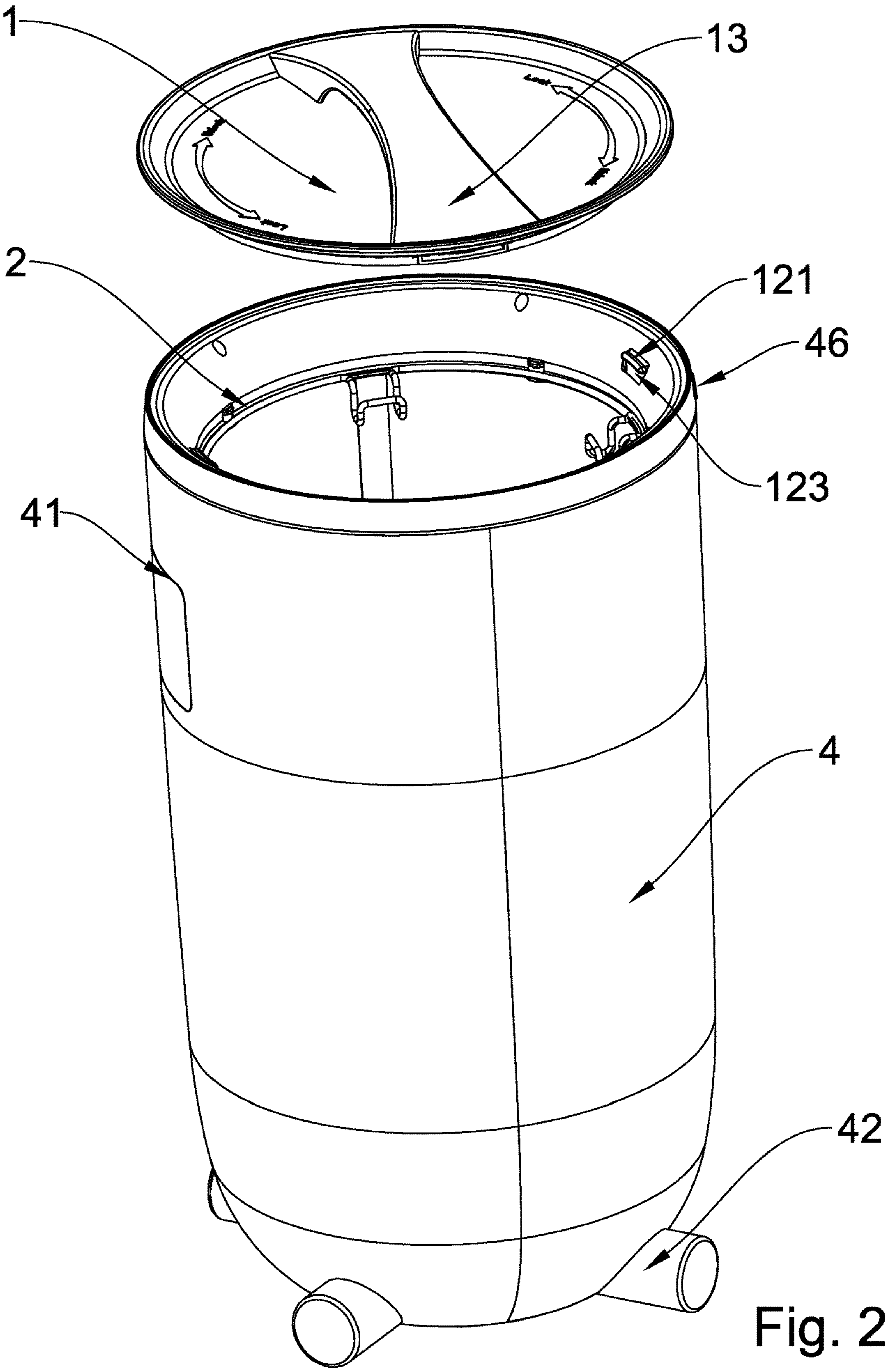
FIG. 2 is a structural schematic diagram of the turnbuckle of a child lock structure, hook structure, handle structure and heating barrel proposed by the invention.
Figure 3:
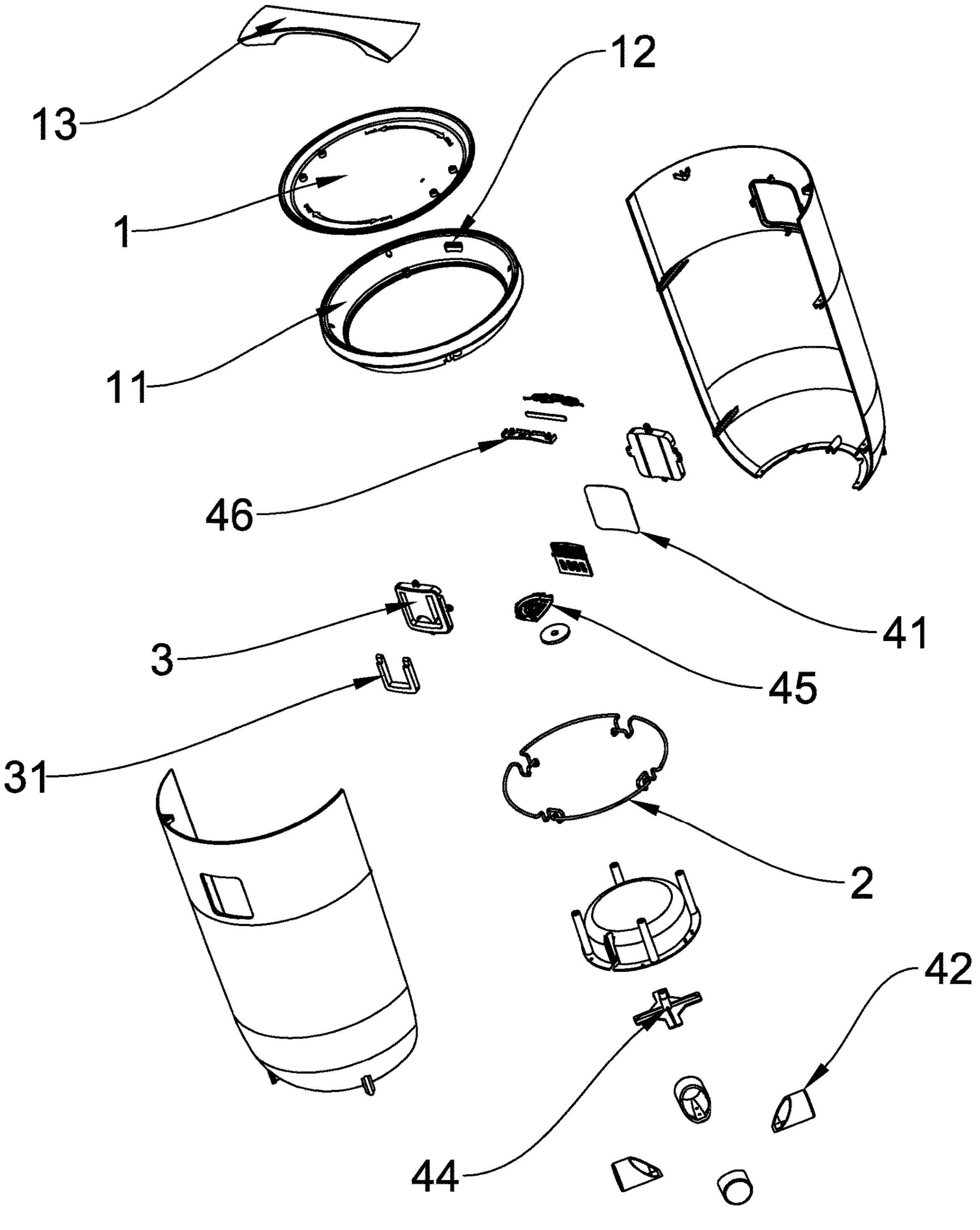
FIG. 3 is a structural exploded view of a child lock structure, hook structure, handle structure and heating barrel proposed by the invention.
Figure 4:
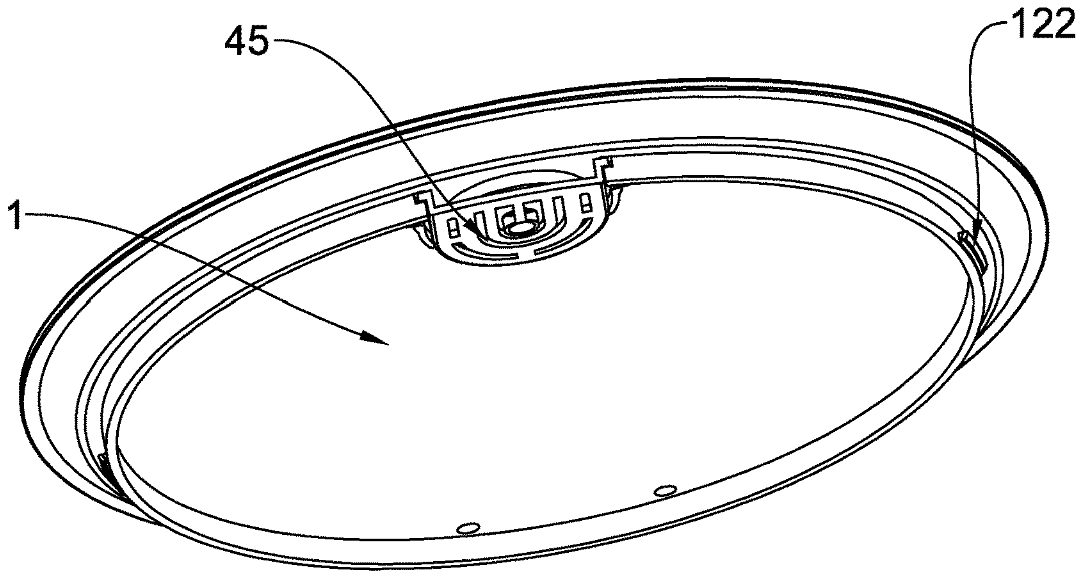
FIG. 4 is a structural schematic diagram of the barrel cover of a child lock structure, hook structure, handle structure and heating barrel proposed by the invention.

Referring to FIGS. 1 to 8, a child lock structure, hook structure, handle structure and heating barrel of the invention comprises a barrel ring mouth 1, a barrel cover 11 and a turnbuckle 12, wherein the barrel ring mouth 1 is arranged at the top of the heating barrel, and the barrel cover 11 is rotatably clamped at the top of the barrel ring mouth 1 through the turnbuckle 12; the turnbuckle 12 comprises at least two pressing buckles 121 symmetrically arranged at the top of the barrel ring mouth 1 and at least two clamping buckles 122 symmetrically arranged at the bottom of the barrel cover 11; the turnbuckle 12 further comprises a clamping groove 123 which is opened at the top of the barrel ring mouth 1 and located below the pressing buckle 121, so as to close the barrel cover 11 and the barrel ring mouth 1 and stagger the pressing buckle 121 and the clamping buckle 122; rotate the barrel cover 11 to drive the clamping buckle 122 into the inside of the clamping groove 123, to realize the locking of the barrel cover 11 and the barrel ring mouth 1. As shown in FIGS. 2 and 4, make the barrel cover 11 and the barrel ring mouth 1 face up and down and stagger the pressing buckle 121 and the clamping buckle 122. After closing the barrel cover 11 and the barrel ring mouth 1, rotate the barrel cover 11, so that the clamping buckle 122 slides under the pressing buckle 121 and is stuck in the clamping groove 123. The barrel ring mouth 1, the pressing buckle 121 and the clamping buckle 122 are all made of plastic and have certain elasticity. When closing the barrel cover 11 and the barrel ring mouth 1, it is necessary to press the barrel cover 11 hard, so that the clamping buckle 122 can be squeezed and staggered with the turnbuckle 12. When the clamping buckle 122 is rotated to the opposite side of the clamping groove 123, it loses the extrusion force and clips into the inside of the clamping groove 123 to complete the locking of the barrel ring mouth 1 and the barrel cover 11.

As a specific technical scheme of this embodiment, the top of the barrel cover 11 is provided with a handle 13, which is convenient for users to lift and rotate the barrel cover 11.

Figure 5:
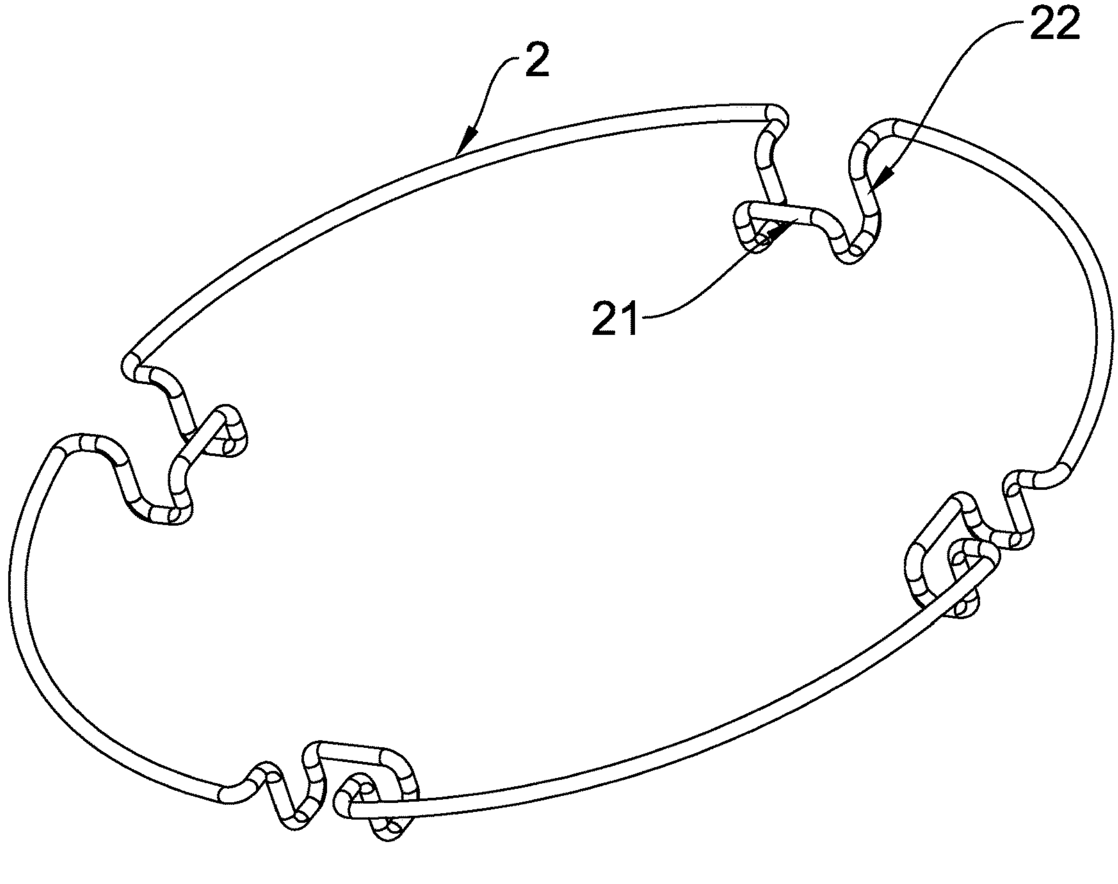
FIG. 5 is a structural schematic diagram of the hook ring of a child lock structure, hook structure, handle structure and heating barrel proposed by the invention.

A hook structure, comprising a hook ring 2 and a barrel ring mouth 1, the hook ring 2 is movably arranged inside the barrel ring mouth 1, and the hook ring 2 is formed by one-time stamping; the inner ring of the hook ring 2 is stamped with a number of not less than one U-shaped hook 21, and the hook ring 2 and the U-shaped hook 21 are stamped with a Z-shaped connector 22. As shown in FIG. 5, the hook ring 2 is formed by one-time stamping, and the whole body has only one welding spot; the arrangement of the U-shaped hook 21 and the Z-shaped connector 22 is conducive to users to hang clothes and towels for heating.

Figure 6A:
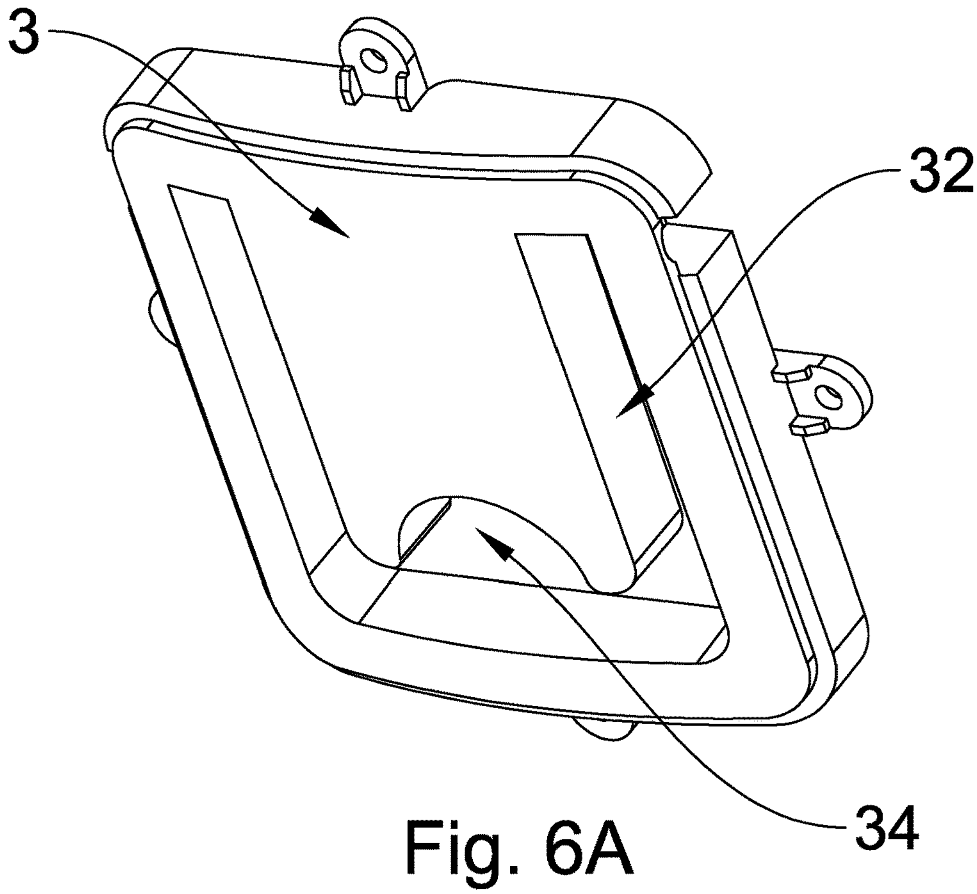
FIG. 6A is a structural schematic diagram of the handle base of a child lock structure, hook structure, handle structure and heating barrel proposed by the invention.
Figure 6B:
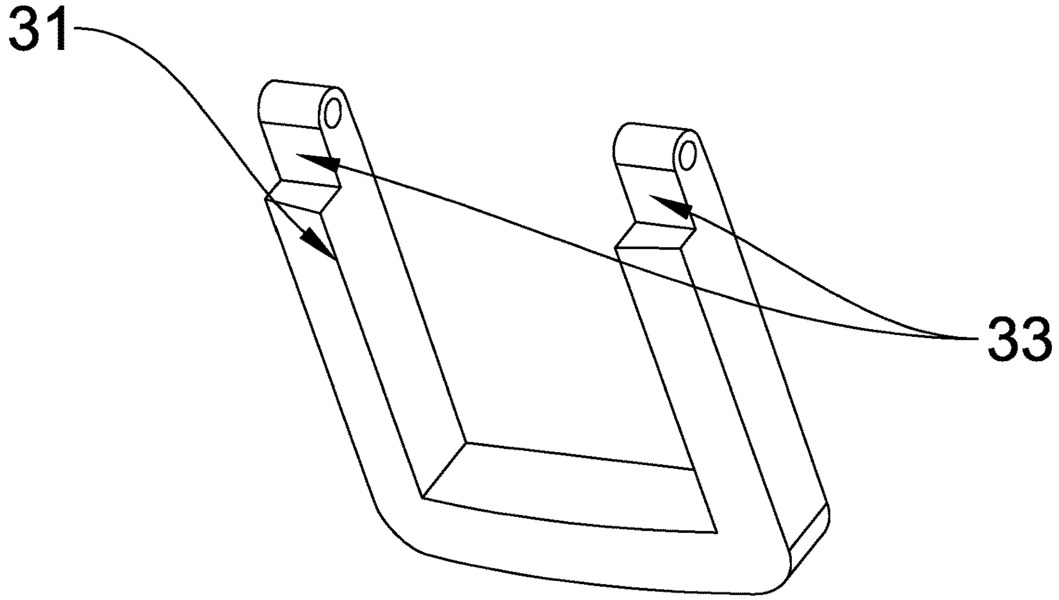
FIG. 6B is a structural schematic diagram of the handle base of a child lock structure, hook structure, handle structure and heating barrel proposed by the invention.
Figure 7:
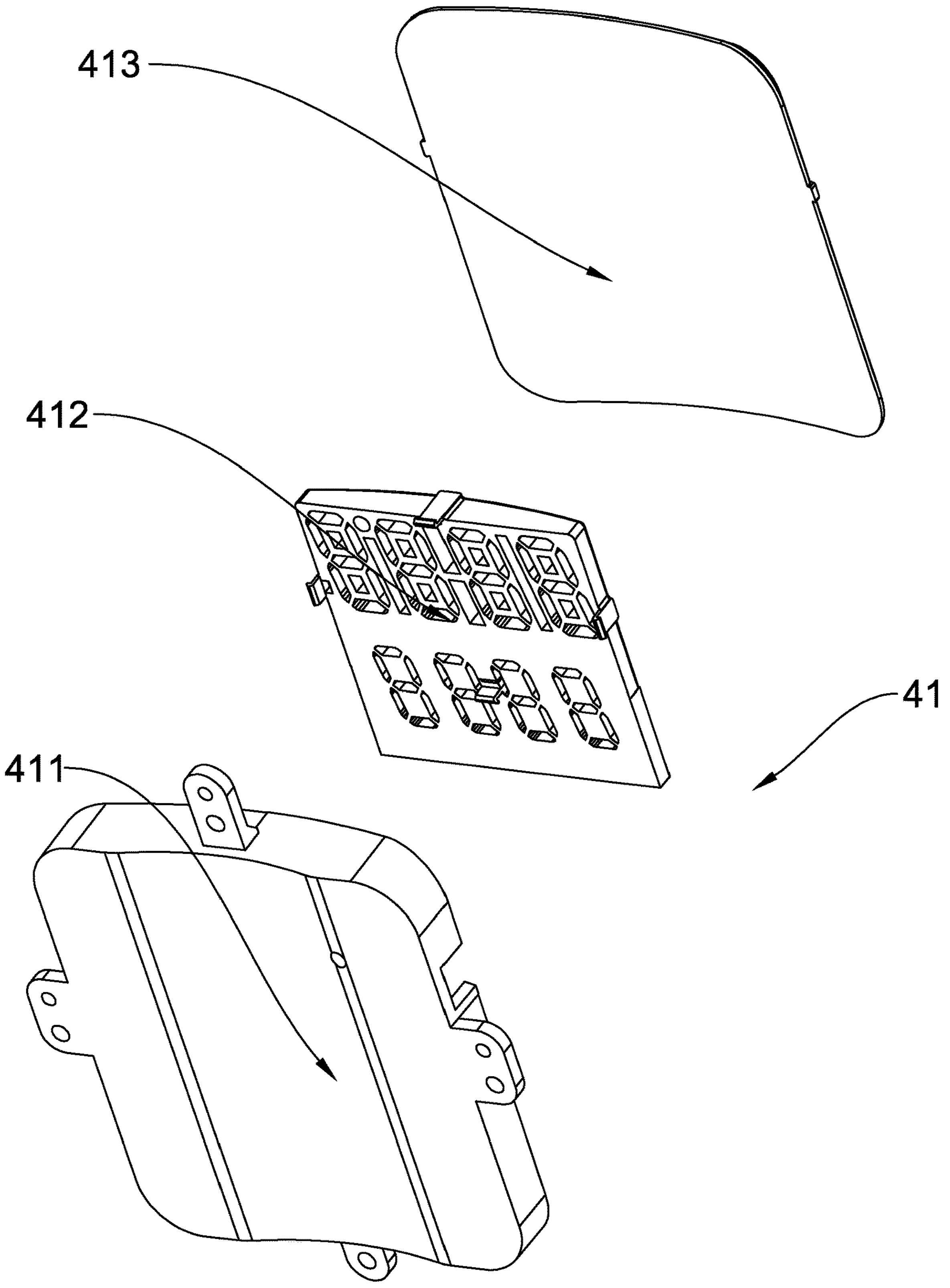
FIG. 7 is a structural exploded view of the display module of a child lock structure, hook structure, handle structure and heating barrel proposed by the invention.
Figure 8:
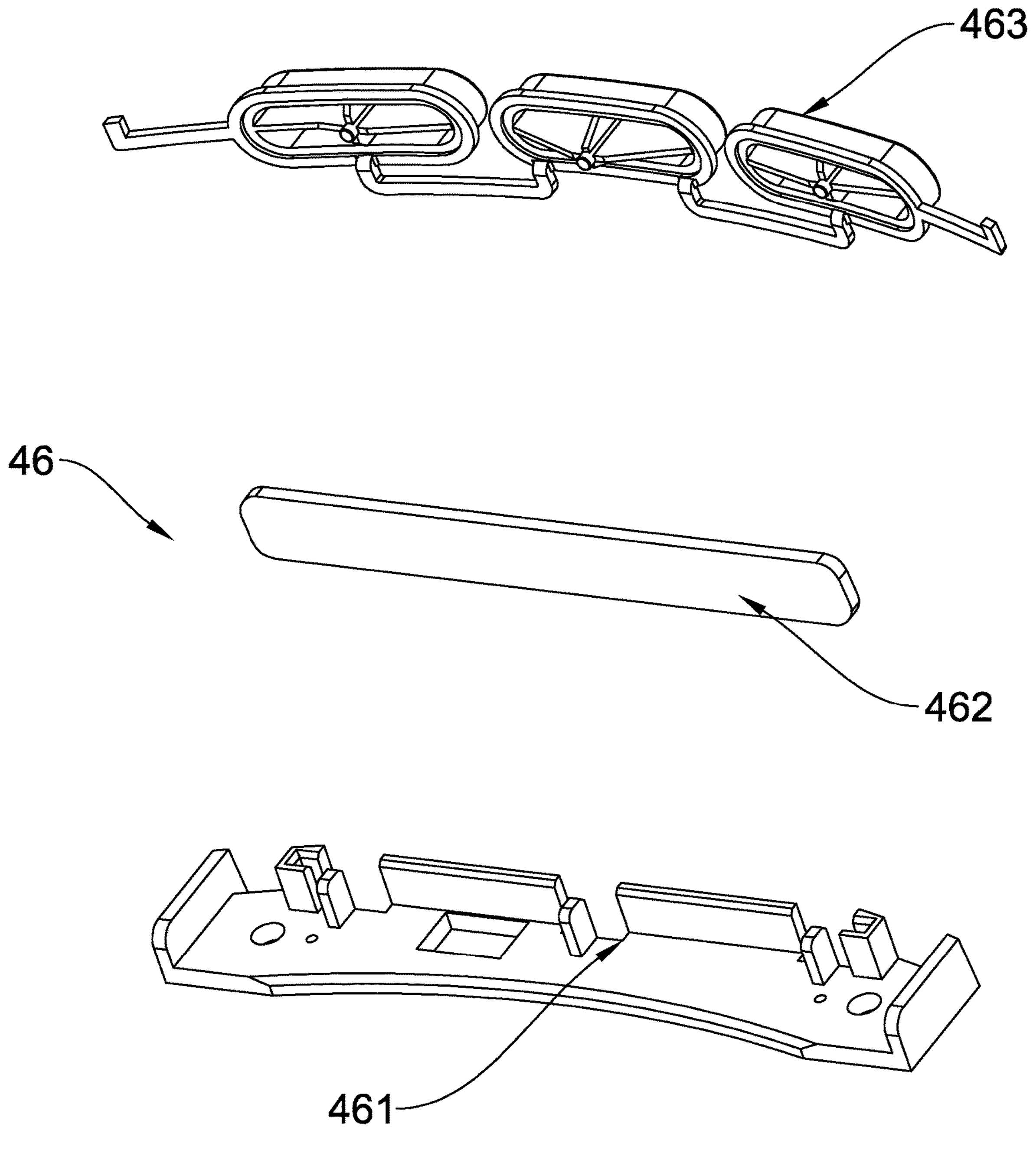
FIG. 8 is a structural exploded view of the digital display key of a child lock structure, hook structure, handle structure and heating barrel proposed by the invention.

A handle structure, comprising a handle base 3 and a handle body 31, wherein the handle base 3 is embedded on the outer wall of the heating barrel, and the handle base 3 is provided with a U-shaped groove 32 inside; the handle body 31 is U-shaped and is rotatably connected with the U-shaped groove 32. When the handle body 31 is flipped to lift the heating barrel, the center of gravity of the handle body 31 and the center of gravity of the heating barrel are on the same vertical line, so that lifting the heating barrel are on the same vertical line. It won't be awkward to lift the heating barrel. It has good stability, and this design scheme only needs a single handle structure. The structure is more simplified. As shown in FIGS. 6A and 6B, the handle body 31 is rotatably arranged in the U-shaped groove 32, and the handle body 31 is pulled out in an upside-down way. This design scheme makes the handle body 31 more stable when it is stored. It is also possible to adopt an upside-down design, in which the handle base 3 and the handle body 31 are turned over by 180° and installed, so that the handle body 31 is pulled out in a downside way.

As a specific technical scheme of this embodiment, one side of the inner wall of the U-shaped groove 32 is provided with a turnover groove 34, and the tops of the two ends of the handle body 31 are also provided with limit notches 33. As shown in FIGS. 6A and 6B, the design of the limit notch 33 makes the limit notch 33 collide with one side of the inner wall of the U-shaped groove 32 when the handle body 31 is turned up in place, so that it cannot be turned over any more, thus avoiding the situation of pinching hands and being safer to use.

A heating barrel, comprising the child lock structure, the hook structure, the handle structure and the barrel body 4, wherein the barrel ring mouth 1 is fixedly installed at the top of the barrel body 4, and the handle base 3 is fixedly embedded on the outer wall of the barrel body 4. The heating wire for heating is arranged inside the barrel body 4, and the highest temperature can reach 126 degrees, so that bath towels, towels, clothes and the like can be heated to remove moisture, damp, keep warm and sterilize.

As a specific technical scheme of this embodiment, the outer wall of the barrel body 4 is embedded with a display module 41, which comprises a digital display bracket 411 embedded on the outer wall of the barrel body 4, a PCB bracket 412 arranged on one side of the digital display bracket 411 and a display panel 413 arranged on one side of the PCB bracket 412. The digital display bracket 411 is used to install the PCB bracket 412, and the PCB bracket 412 is provided with a digital tube, through which the time and temperature are displayed. The display panel 413 is used to protect the PCB bracket 412, further ensuring the appearance of the product.

A circle at the bottom of the barrel body 4 is also provided with at least one support leg 42, and the arrangement of multiple support legs 42 ensures the stability of the barrel body 4.

The inner bottom of the barrel body 4 is provided with a base 43, and the inside of the base 43 is provided with a power cord rack 44 with one end extending into the barrel body 4. The base 43 is used for shielding the bottom of the barrel body 4, and the power cord rack 44 is used for installing the power cord connected with the heating wire, the display module 41 and the digital display key 46.

The bottom of the barrel cover 11 is provided with an aromatherapy tablet holder 45. As shown in FIG. 4, the aromatherapy tablet holder 45 is movably inserted into the barrel cover 11, which is convenient for users to replace the aromatherapy tablets.

As a specific technical scheme of this embodiment, the inside of the barrel ring mouth 1 is provided with a digital display key 46, which comprises a circuit board 462 bracket 461, a circuit board 462 arranged on the circuit board 462 bracket 461 and a switch key 463 arranged on one side of the circuit board 462. One side of the switch key 463 extends to the outside of the barrel ring mouth 1. The number of the switch keys 463 is not less than one, which are used to control the switch, time reservation, time adjustment and temperature adjustment of the heating barrel.

To sum up, with the arrangement of the child lock structure, the hook structure, the handle structure and the heating barrel, and the single handle body 31, the structure is simplified; after the heating barrel is lifted, the centers of the handle body 31 and the heating barrel are on a same vertical line, so that the lifting is more stable; the hook ring 2 is formed by one-time stamping, and the whole body has only one welding spot, so that the stability is higher; the barrel cover 11 is clamped with the barrel ring mouth 1 by the turnbuckle 12, so that the child lock is realized, and the situation that children are scalded when opening the cover is avoided.

While the invention has been described in terms of preferred embodiments, those skilled in the art will recognize that the invention can be practiced with modifications within the spirit and scope of the appended claims.

What is claimed is:

1. A heating barrel, comprising:
a child lock structure;
a hook structure;
a handle structure; and
a barrel body,
wherein a barrel ring mouth is fixedly installed at a top of the barrel body, a barrel cover is rotatably clamped at a top of the barrel ring mouth, and a handle base is fixedly embedded on an outer wall of the barrel body;
wherein the outer wall of the barrel body is embedded with a display module including a digital display bracket embedded on the outer wall of the barrel body, a printed circuit board (PCB) bracket arranged on one side of the digital display bracket, and a display panel arranged on one side of the PCB bracket;
wherein at least one support leg is provided at a bottom of the barrel body;
wherein a power cord rack is provided in the bottom of the barrel body; the power cord rack having one end extending into the barrel body; and
wherein an aromatherapy tablet holder is provided at a bottom of the barrel cover.

* * * * *